US009557072B2

(12) United States Patent
Tolinski et al.

(10) Patent No.: US 9,557,072 B2
(45) Date of Patent: Jan. 31, 2017

(54) VENT COVER

(71) Applicant: Dometic Sweden AB, Solna (SE)

(72) Inventors: Roch J Tolinski, Imlay, MI (US); Lorin A Milks, Imlay, MI (US); James E Allard, Imlay, MI (US)

(73) Assignee: Dometic Sweden AB, Solna (SE)

( * ) Notice: Subject to any disclaimer, the term of this patent is extended or adjusted under 35 U.S.C. 154(b) by 753 days.

(21) Appl. No.: 13/663,156

(22) Filed: Oct. 29, 2012

(65) Prior Publication Data

US 2013/0109294 A1    May 2, 2013

Related U.S. Application Data

(60) Provisional application No. 61/552,952, filed on Oct. 28, 2011.

(51) Int. Cl.
    *F24F 13/20*    (2006.01)
    *F24F 13/08*    (2006.01)
    *B60H 1/26*     (2006.01)

(52) U.S. Cl.
    CPC ............. *F24F 13/20* (2013.01); *F24F 13/082* (2013.01); *B60H 1/262* (2013.01)

(58) Field of Classification Search
    CPC ............ F24F 7/02; F24F 13/20; F24F 13/082; F24F 13/075; F24L 17/12; F23L 17/12; B60H 1/262; B60H 2001/00235; B60H 1/245
    USPC .................................................. 454/275, 367
    See application file for complete search history.

(56) References Cited

U.S. PATENT DOCUMENTS

| 1,872,599 | A | * | 8/1932 | Le Grand | F24F 13/075 137/601.08 |
| 2,310,828 | A | * | 2/1943 | Back | 454/21 |
| 2,735,351 | A | * | 2/1956 | Abrahamsen | F24F 13/075 454/314 |
| 2,839,986 | A | * | 6/1958 | Herman | F24F 13/08 114/211 |
| 3,145,642 | A | * | 8/1964 | Radcliff | F24F 13/15 454/315 |
| 3,345,930 | A | * | 10/1967 | Ammons | 454/315 |
| 3,385,198 | A | * | 5/1968 | Farr | B61C 5/02 165/134.1 |
| 3,390,625 | A | * | 7/1968 | Maxson | F24F 13/075 454/314 |

(Continued)

FOREIGN PATENT DOCUMENTS

CA        2312320 A1 * 12/2001

*Primary Examiner* — Alissa Tompkins
*Assistant Examiner* — Frances F Hamilton
(74) *Attorney, Agent, or Firm* — Middleton Reutlinger

(57) ABSTRACT

A vent cover for covering an opening in a building structure to vent its interior is provided. The vent cover includes a hollow cover member with an open bottom for positioning over and covering the opening in the building and a front end with an opening. A grill is removably secured in the opening in the front end of the cover member. The grill has a plurality of partitions. Each of the partitions is defined by intersecting members, which have a tapered cross section for accelerating the flow of air through the grill. The grill also has a splash guard and an overhang structure optimal for preventing rain, snow and water from entering the grill and the opening in the building structure. The cover member may be aerodynamically shaped for use atop vehicles such as trailers and RVs.

6 Claims, 4 Drawing Sheets

(56) References Cited

U.S. PATENT DOCUMENTS

| | | | | |
|---|---|---|---|---|
| 4,545,294 A * | 10/1985 | Dayus | ................... | F24F 13/08 160/236 |
| 4,607,565 A * | 8/1986 | Sugawara | ............ | F24F 13/075 454/314 |
| 4,625,630 A * | 12/1986 | Carroll | ................ | B65D 88/741 403/241 |
| 4,691,766 A * | 9/1987 | Wurz | ....................... | F28F 1/12 165/124 |
| 5,328,405 A * | 7/1994 | Jarnot | ............................ | 454/78 |
| 5,588,908 A * | 12/1996 | Camarota | ...................... | 454/78 |
| 5,591,080 A * | 1/1997 | Ward | ....................... | F24F 7/02 454/359 |
| 5,632,678 A * | 5/1997 | Doelfel | .......................... | 454/366 |
| 5,916,023 A * | 6/1999 | Meyer | ..................... | D06F 58/14 34/235 |
| 6,183,360 B1 * | 2/2001 | Luter, II | ..................... | F24F 7/02 454/366 |
| 6,212,833 B1 * | 4/2001 | Henderson | ........... | E04D 13/172 454/365 |
| 6,685,556 B1 * | 2/2004 | Bertin | .................. | F24F 13/075 454/248 |
| 6,994,622 B2 * | 2/2006 | Koessler | ....................... | 454/367 |
| 7,004,832 B2 * | 2/2006 | Thomas | ................ | B60H 1/262 454/129 |
| 7,774,999 B2 * | 8/2010 | McKee | ........................... | 52/199 |
| D629,094 S | 12/2010 | Thomas | | |
| 2001/0046838 A1* | 11/2001 | Hertel | .......................... | 454/259 |
| 2004/0087266 A1* | 5/2004 | Cigelske, Jr. | ........ | B23K 9/1006 454/277 |
| 2004/0157543 A1* | 8/2004 | Bertin | ................... | F24F 13/075 454/258 |
| 2007/0049190 A1* | 3/2007 | Singh | ...................... | E04D 13/17 454/365 |
| 2008/0188176 A1* | 8/2008 | Hunt | ..................... | E04D 13/17 454/366 |
| 2009/0053990 A1* | 2/2009 | McKee | ......................... | 454/250 |
| 2009/0139154 A1* | 6/2009 | Aderman | ........... | A01K 1/0058 52/95 |
| 2011/0294412 A1* | 12/2011 | Vagedes | .................... | F24F 7/02 454/242 |
| 2013/0078903 A1* | 3/2013 | Mantyla | .................... | F24F 13/222 454/367 |
| 2014/0094107 A1* | 4/2014 | Randleman et al. | ......... | 454/275 |

* cited by examiner

VENT COVER

REFERENCE TO RELATED APPLICATION

This application claims priority to U.S. Provisional Application No. 61/552,952, filed Oct. 28, 2011, which is hereby incorporated by reference.

BACKGROUND OF THE INVENTION

The invention generally relates to air vents, and more particularly, to an outdoor vent cover.

Vent covers are known. One such cover is shown in U.S. D629,094. Like this design, vent covers for outdoor use typically include a venting portion to permit airflow and a protective shell to keep rain and snow out. Thus, the challenge to innovators is to produce a design having features for keeping the weather out, but also permitting the air to flow freely and efficiently to vent the enclosed area. Despite state-of-the-art technology and materials, problems of partially occluded grills and leaky covers persist. There is, therefore, a need for an improved outdoor vent cover capable of optimal venting of the interior of a building structure, but which prevents rain, wind and water from entering the building. The present invention is directed toward meeting this need.

SUMMARY OF THE INVENTION

The new vent cover may be used to cover a vent or opening extending through the roof or wall of a building structure. The unique design of the vent cover improves passive venting of the interior of the building. The vent cover includes a hollow cover member with an open bottom for positioning above and covering the opening in the building structure and a front end with an opening. A grill is removably secured in the opening in the front end. The grill has a plurality of partitions, and each of the partitions is defined by intersecting members. The intersecting members have a tapered cross section.

In another aspect of the invention, the grill has a bottom splash guard, and the partitions are formed in an upper vent portion of the grill. The vent portion extends upwardly from the bottom splash guard and outwardly toward the front end of the cover member so that the vent portion of the grill overhangs the splash guard.

In another aspect, the vent portion of the grill includes a top, and the front end of the cover member extends outwardly in a manner such that it overhangs the top so that the opening in the front end or edge of the cover is downstream or in front of the grill and the cover overhangs the grill.

One object of the invention is to provide an improved vent cover that provides optimal venting of the interior of a building structure while preventing rain, wind and water from entering the building. Related objects and advantages of the invention will be apparent from the following description.

BRIEF DESCRIPTION OF THE DRAWINGS

The details of the invention, both as to its structure and operation, may be obtained by a review of the accompanying drawings, in which.

DETAILED DESCRIPTION OF INVENTION

Figure 1:
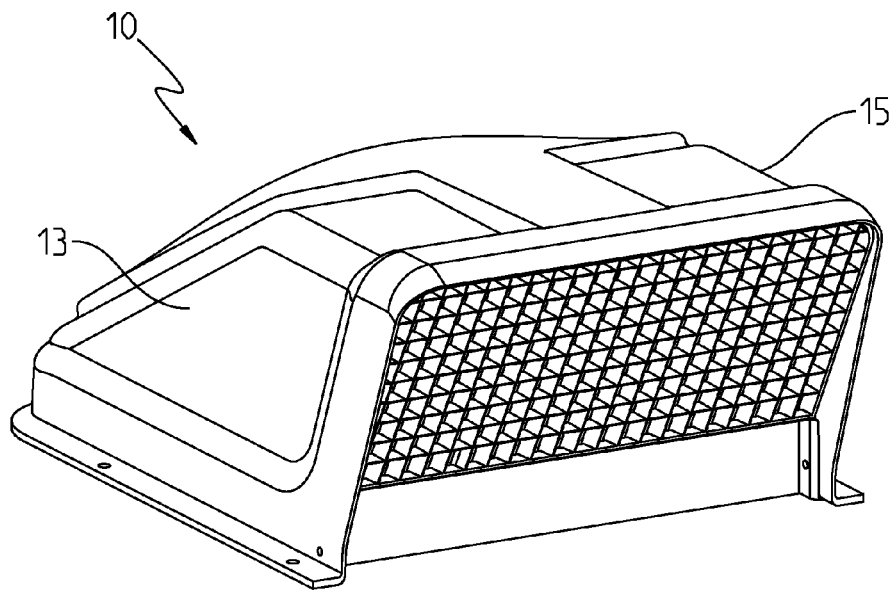
FIG. 1 is an isometric view showing the front of an embodiment of the vent cover of the invention.

For the purposes of promoting an understanding of the principles of the invention and presenting its currently understood best mode of operation, reference will now be made to the embodiments illustrated in the drawings, and specific language will be used to describe the same. It will nonetheless be understood that no limitation of the scope of the invention is thereby intended, with such alterations and modifications in the illustrated device and such further applications of the principles of the invention as illustrated therein being contemplated as would normally occur to one skilled in the art to which the invention pertains.

The vent cover 10 may be useful for covering any opening where it is desirable for air, but not water, snow or other undesirables, to freely pass. Thus, the new vent cover provides a means for air from the inside to circulate and passively flow to the exterior of a building structure or other enclosure, including a recreational vehicle (RV), tent or the like, despite a heavy storm with wind, rain or snow. Some vents, like the one schematically shown in the phantom lines of FIG. 6, may include a cover 19 that can be raised and lowered or an electric motor with fan (not shown) so venting may be controlled as desired. The new vent cover, therefore, is sized to accommodate motors, fans, as well as the raising and lowering of lids and covers, like the example in FIG. 6, enabling them to function as intended.

Figure 2:
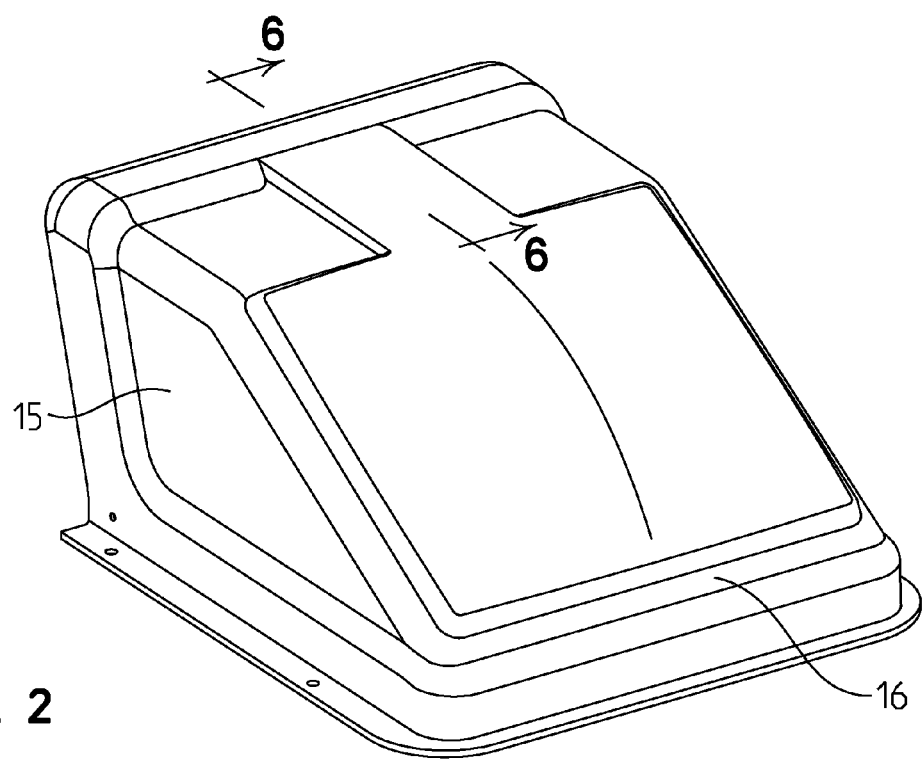
FIG. 2 is an isometric view showing the back of an embodiment of the vent cover of the invention.
Figure 3:
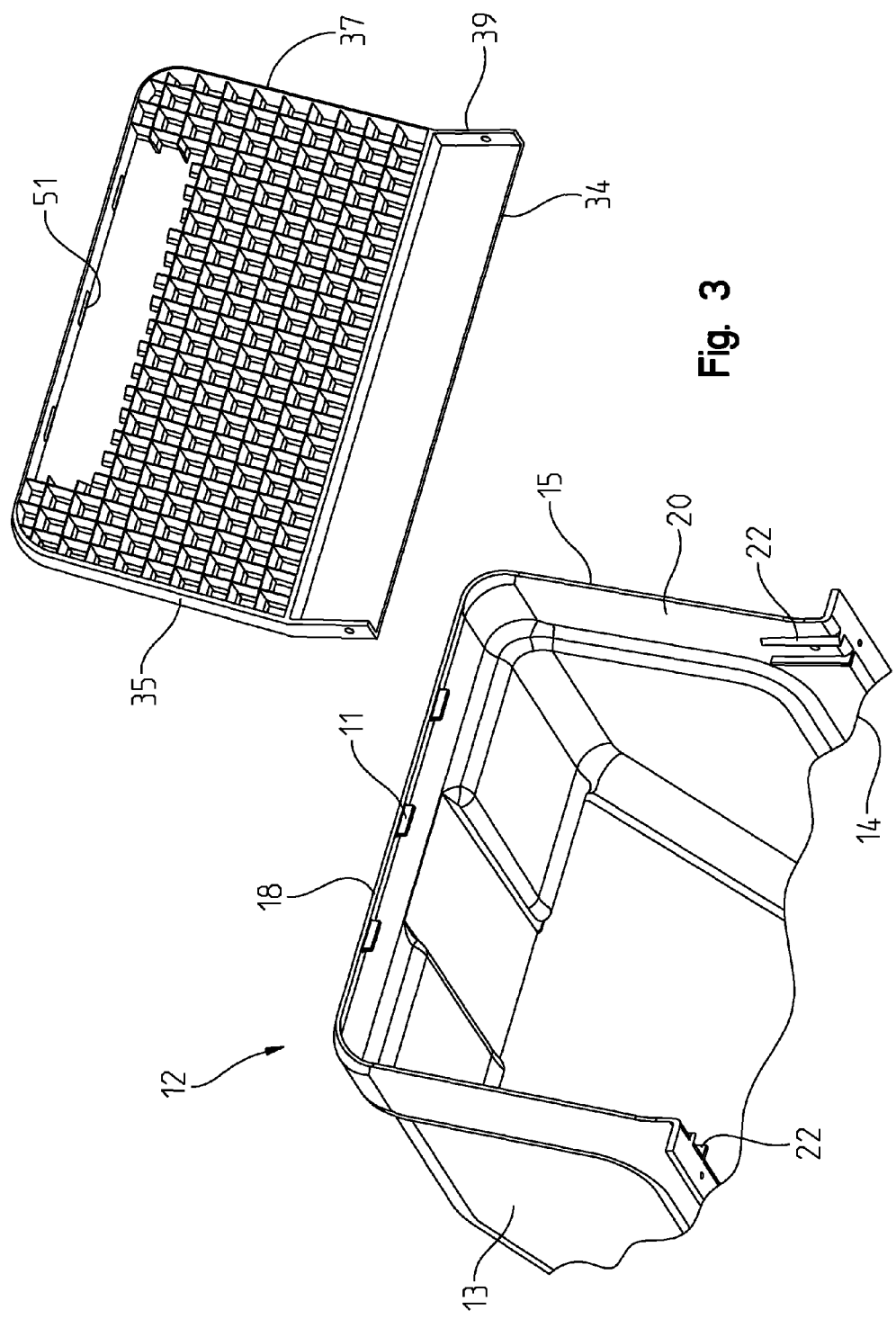
FIG. 3 is a perspective view showing the grill and cover member of the invention disassembled. The cover member and the grill are shown partially cutaway to illustrate the tabs, cutouts, and channels formed in the cover member and grill.

Referring to the Figures, a vent cover 10 for covering a vent and/or opening 44 extending through the roof of a building structure 40 is shown. In one embodiment, the vent cover includes a hollow upstanding cover member 12 with an open bottom 14 for positioning above and covering the opening in the building structure, a pair of sides 13, 15, a closed back end 16, and a front end 18 with an opening 20, as shown in FIGS. 1-3. The closed back of the cover member may be aerodynamically shaped like the example shown in the Figures making it well suited for placement on top of a towable trailer or recreational vehicle, for example.

Figure 4:
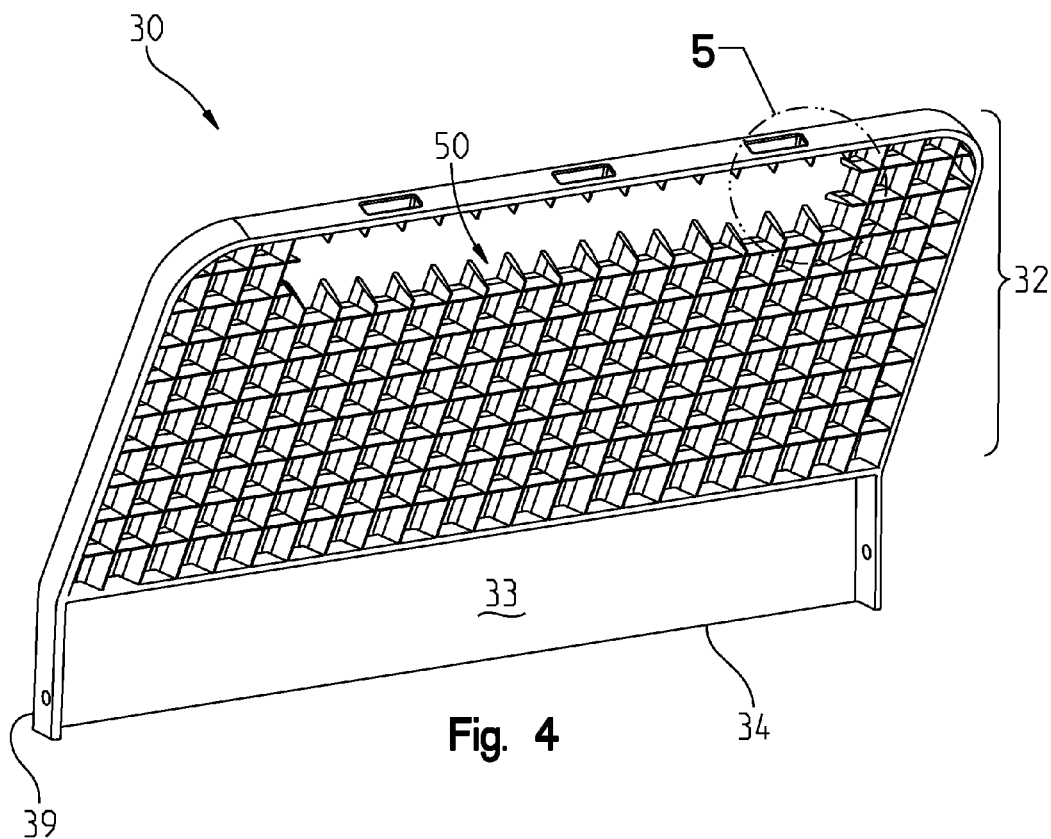
FIG. 4 is an enlarged view of the grill of FIG. 3.
Figure 5:
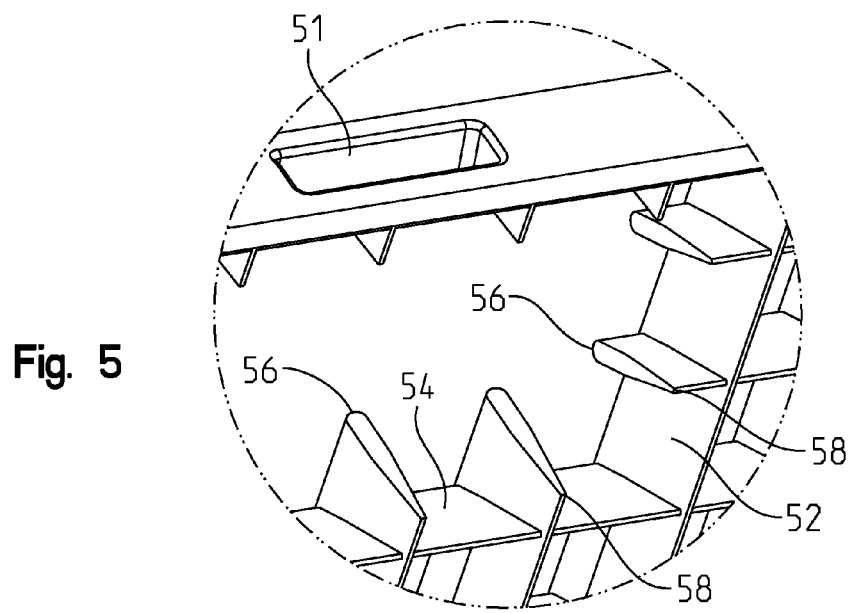
FIG. 5 is an enlarged view of the area within the phantom-lined circle of FIG. 4 showing the cross section of the intersecting members that form the vent portion of the grill; and, FIG. 6 is a cross sectional view of an embodiment of the vent cover taken along line 6-6 of FIG. 2. The phantom lines show a prior art vent with a movable cover to open and close the vent. The vent is shown in the open position.
Figure 6:
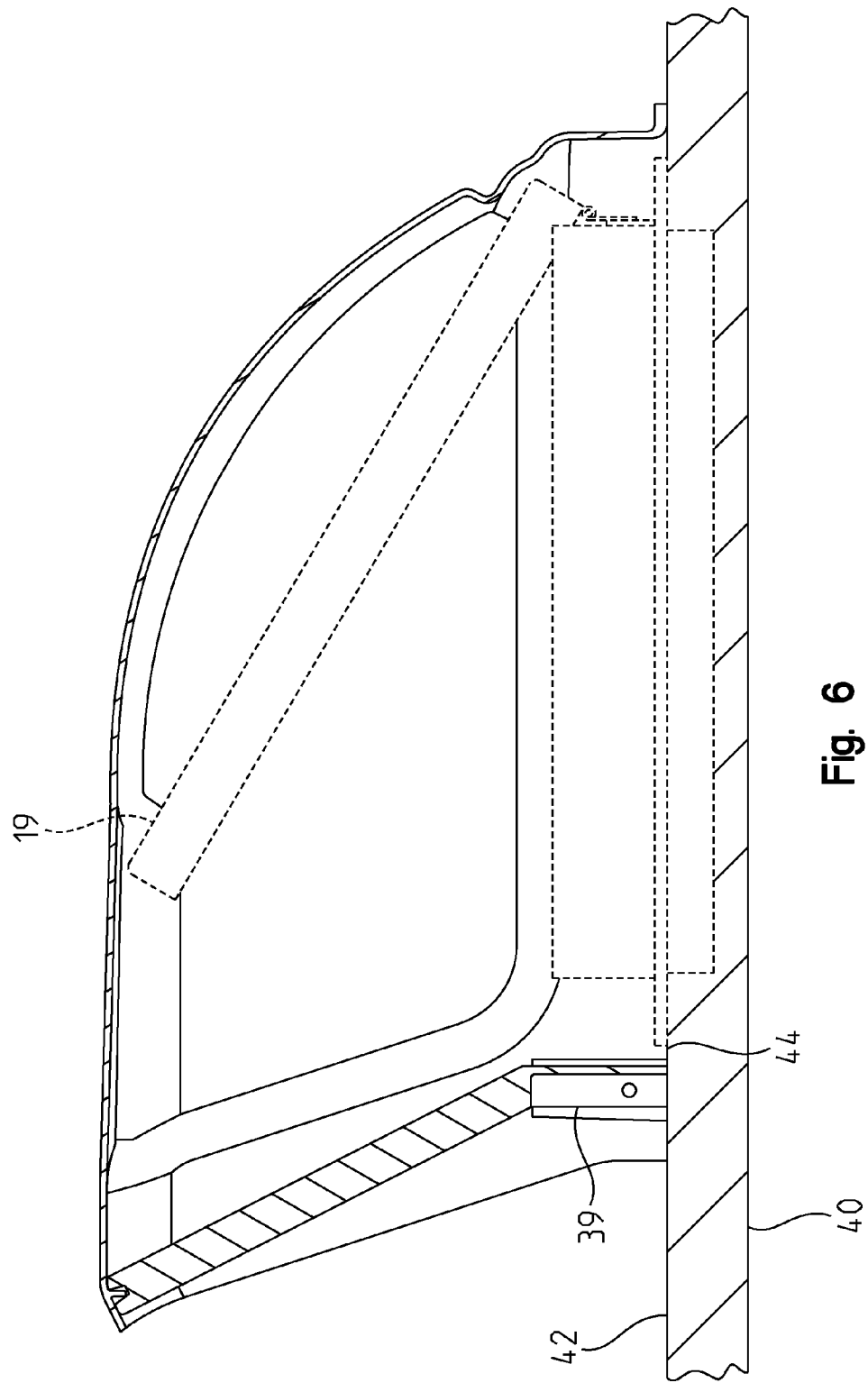

Referring to FIGS. 4-6, the grill 30 has a top vent portion 32, a bottom 34, opposite sides 35, 37, and a top 38. In one embodiment, the bottom includes an upstanding splash guard 33 extending between the opposite sides. The splash guard 33 is preferably contiguous with and transverse to the surface 42 of the building structure 40 when the grill is secured in the opening 44 (FIG. 5) of building structure to prevent water from reaching the opening 44 in the roof via the opening 20 in the front end of the vent cover. Seals may also be added to, overlaid, or integrally formed with, portions of the cover, grill or both the cover and the grill to accomplish desired weather resistant/proofing features accordingly. Rigid or nonrigid seals may be included under the splash guard 33 and cover member, for example.

Referring to FIGS. 4-5, the vent portion 32 of the grill 30 includes a plurality of partitions 50. In one embodiment, the partitions are formed by intersecting members 52, 54. Each of the intersecting members is aerodynamically formed. In one embodiment, each has a cross section having an arcuate shaped forward end 56 tapering rearwardly toward a rear end 58. In that embodiment, the forward end of the cross sections are directed toward the closed back end 16 of the hollow cover member 12 when the grill 30 is removably fastened in the opening 20 of the front end 18. In this manner, the grill 30 increases the velocity, which reduces, in part, the pressure of the air flowing through the partitions 50. Thus, the vent grill 30 produces an overall increase in the volume of air flowing from the interior through the opening 44 in the building structure 40.

In one embodiment, the vent portion 32 extends upwardly from the bottom splash guard 33 and outwardly toward the front end 18 of opening 20 in the front end of the cover member 12 so that the vent portion of the grill 32 overhangs the splash guard 33. With reference to FIGS. 3-6, the unique combination of the solid splash guard and the angled orientation of the vent portion of the grill prevents water, which mostly flows perpendicularly downward, from reaching through the opening 44 beneath the cover. In one non-limiting example, the vent portion 32 of the grill 30 is formed so that it overhangs the splash guard at an angle of between about 12° and 25°. In other embodiments, or perhaps assemblies that include a motorized fan positioned in the opening for example, the angle between the splash guard and top portion of the grill is greater (25.5°-35°) or lesser (5.5°-11.5°) than a figure in the twelve-to-twenty-five degree range of angles.

In the embodiment illustrated, the grill 30 is removably secured in the opening 20 of the front end 18 of the cover using mating structures formed in the cover and/or grill so that the grill can be releasably fastened by hand into the opening 20. Protruding portions 22 define channels in the interior surfaces of the sides 13, 15, of the cover member 12, as best shown in FIG. 3. In that embodiment, the protruding portions 22 on both sides of the cover define a channel for receiving the legs 39 located on the ends of the bottom 34 of the grill. In one embodiment, a snap fit is also provided by way of an indention receiving a protruding portion(s). These structures may be formed in the interior surfaces of the sides 13, 15 of the cover member 12 and the legs 39 of the grill, respectively, or visa versa, as shown in FIGS. 3, 4 and 6.

Additionally, with reference to FIGS. 3-5, cutouts 51 extending through the top of the grill receive the tabs 11 formed in the underside of the top of the cover member to releasably connect the grill securely in the opening 20. To assemble vent cover 10, the grill 30 is positioned with the cutouts 51 loaded over tabs 11. Next, the bottom 34 is rotated inward, or rocked into opening 20 until the legs 39 are retained by the channel portions 22, and the protruding elements are received by the corresponding indentions.

Unlike prior vent covers, the intersecting members 52, 54 of the grill of the present invention can be arranged horizontally relative to the surface of the roof of the building structure when the vent cover is positioned above the opening in the roof. Thus, water is kept out and airflow is not impeded as with most prior vent covers and grills. As mentioned previously, rigid or nonrigid seals may be included to provide further protection from the elements as desired.

The cover and grill may be formed from rigid and/or nonrigid plastic using known means. In some embodiments the rigid and non-rigid features of the cover and grill are formed separately and connected together using means known by skilled artisans. In other embodiments, the rigid and non-rigid features of the cover and grill are integrally formed or over molded.

The cover 12 and grill 30 may be formed from a thermoplastic olefin (TPO). Some portions and parts of the cover and grill may, in some embodiments, be harder than others and/or have varying hardness. Some of the more rigid portions may have a hardness of between about 55-65 Shore D. Other parts and portions of the cover and grill, such as the front portions 22 of the channels and/or the protruding portion(s) on the legs 39, for example, may be integrally formed with or molded over their corresponding supportive structures and have a hardness of between about 65-70 Shore A.

The above materials, compositions, and/or constituent elements forming the particular plastics discussed and their corresponding physical properties, however, should not be construed as limiting. High density polyethylene (HDPE) has been used to form an embodiment of the invention. Preferably, any of various known UV stabilizers or combinations thereof are preferred to be added in the plastic since the vent cover may be used outdoors. Other materials, compositions, and/or constituent elements forming rigid and non-rigid materials or plastics possessing the physical properties useful in a manner as herein described may be appropriately desirable and availed using different materials, compositions, and/or constituent elements without undue experimentation and should be considered to fall within the scope of Applicants' innovative vent cover and grill.

While the invention has been illustrated and described in detail in the drawings and foregoing description, the same is to be considered illustrative and not restrictive in character. It is understood that the embodiments have been shown and described in the foregoing specification in satisfaction of the best mode and enablement requirements. It is understood that one of ordinary skill in the art could readily make a nearly infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A vent cover for covering an opening extending through a roof or wall structure for venting, the vent cover comprising:
    a hollow cover member with an open bottom for covering the opening extending through the roof or wall structure, and a grill opening, said hollow cover member having at least one channel and further comprising at least one of tabs or holes; and
    a grill removably secured in the grill opening in the cover member, said grill comprising an upper vent portion and a bottom splash guard comprising legs disposed below said upper vent portion and said upper vent portion angled relative to said splash guard to overhang said splash guard, at least one of said legs configured to be positioned in said at least one channel, said grill further comprising the other of tabs or holes for engagement with said hollow cover member;
    wherein said grill having a plurality of partitions, each of said partitions being defined by integrally formed intersecting members wherein air passes over two surfaces of said intersecting members, said intersecting members each having rounded leading edge and a tapered cross section for accelerating the flow of air through the grill.

2. A vent cover according to claim 1, wherein the partitions are formed in said upper vent portion of the grill, said upper vent portion extending upwardly from the bottom splash guard and outwardly toward a front end of the cover member so that the upper vent portion of the grill overhangs the splash guard.

3. A vent cover according to claim 1, wherein the upper vent portion of the grill includes a top, a front end of the cover member extends outwardly beyond said top so that the grill opening of the cover member overhangs said grill.

4. A vent cover for covering an opening extending through the roof or wall for venting an interior, the vent cover comprising:
   a hollow cover member with an open bottom for covering the opening through the roof or wall, and a grill opening, a pair of channels defined by protruding portions; and
   a grill removably secured in the grill opening of the cover member, said grill comprising a leg disposed in each of said channels, said grill having one of a tab and a hole and said hollow grill cover having the other of a tab or a hole to releasably connect said grill to said hollow cover member;
   wherein said grill has a plurality of partitions, each of said partitions being defined by integrally formed intersecting members, said intersecting members each having a cross section comprising a thick rounded leading edge and a thin trailing end for accelerating the flow of air through the grill, a splash guard disposed below an upper vent portion of said grill at an angle to said upper vent portion such that said upper vent portion overhangs said splash guard, said grill being oriented in the grill opening of the cover member in a direction wherein the rounded leading edge of the intersecting members faces an inner surface of the cover member.

5. A vent cover according to claim 4, wherein the grill has a bottom splash guard, and the partitions are formed in said upper vent portion of the grill, said upper vent portion extending upwardly from the bottom splash guard and outwardly toward the front end of the cover member so that the vent portion of the grill overhangs the splash guard.

6. A vent cover according to claim 4, wherein the upper vent portion of the grill includes a top, said front end of the cover member extends outwardly beyond said top so that the grill opening in the cover member overhangs said grill.

* * * * *